Patented Oct. 23, 1945

2,387,247

UNITED STATES PATENT OFFICE 2,387,247

COMPOSITIONS OF MATTER AND PYROLYTIC METHODS OF SYNTHESIZING THEM

Frederick B. Downing, Carneys Point, Anthony F. Benning, Woodstown, and Robert C. McHarness, Carneys Point, N. J., assignors to Kinetic Chemicals, Inc., Wilmington, Del., a corporation of Delaware No Drawing. Application March 17, 1942, Serial No. 435,064

3 Claims. (Cl. 260—653)

A. This invention relates to the preparation of organic fluorine compounds of pyrolysis. By pyrolysis, we mean the transformation of a compound into another substance or other substances through the agency of heat alone. (Hurd, The Pyrolysis of Carbon Compounds, page 9.) The term pyrolysis used in this specification therefore will include not only the decomposition of compounds but also the making of more complex compounds. In the applications identified as Benning et al., Serial No. 344,666, filed July 10, 1940, and Benning Serial No. 379,473, filed February 18, 1941 are disclosed two processes involving a reaction between a fluoro-hydrocarbon and HCl in the presence of a catalyst. Those reactions may be described as additive, since their apparent course is the addition of HCl to the olefine in the place of double bonds. Those reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are of a fundamentally different nature than HCl addition and that they can be put to valuable use.

B. It is an object of this invention to produce organic compounds by pyrolysis. Another object of the invention is to produce compounds which are useful, by methods which are economically and technically satisfactory. Another object of the invention is to produce new fluoro hydrocarbons. A particular object of the invention is to synthesize organic compounds having fluoralkyl chains by the pyrolysis of fluorohalogeno carbon compounds. Another object of the invention is to produce the compound $CF_2=CF_2$ by methods which are technically and economically satisfactory.

C. According to the preferred form of our invention fluoro-chloro or bromo alkanes, fluoro-chloro or bromo alkenes, and fluoro alkenes, which may otherwise be called fluoro-chloro or bromo saturated aliphatic, fluoro-chloro or bromo unsaturated aliphatic, and fluoro unsaturated aliphatic compounds, are made into other compounds by pyrolysis.

D. As a starting material we use members of the fluoro-bromo-alkanes either alone or mixed. These starting materials may be pyrolyzed alone or they may be mixed together before pyrolysis. For example, a fluoro-chloro alkane and a fluoro-bromo alkene may be pyrolyzed together.

E. Many of the compounds set forth in this specification and others which have been used but are not included herein have been pyrolyzed in the presence of other pyrolyzable compounds of these classes and of other classes. In every instance the starting material was successfully pyrolyzed by the process, which is to say that a pyrolytic reaction took place. Differences in result have been observed when fluorine compounds containing no other halogen, and fluorine compounds containing chlorine and no other halogen, and fluorine compounds containing bromine and no other halogen are separately pyrolyzed. Differences are also observed in the pyrolytic reactions of saturated and unsaturated compounds.

F. Although for the production of particular compounds the reaction will be carried out under well-controlled conditions of time, temperature and pressure, complex mixtures of compounds of various molecular weights can be produced by subjecting the compounds to reaction conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between .1 and 10 atmospheres absolute, but other pressures are useful and may be employed when an increase in efficiency will result.

G. This a pyrolytic process. The reaction is produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular reactants have pyrolyzed at temperatures as low as 400° C. and above 1000° C. under appropriate conditions of time and pressure. Electrical heating is efficient, but any method of heating may be applied. The temperatures which are used must be chosen in view of the materials that compose the reaction apparatus.

H. The time of exposure of the reactants to the pyrolytic conditions is a matter of considerable importance where a particular product is desired. Extending the period of exposure frequently produces compounds of increased molecular weight.

I. In general, the reaction proceeds efficiently in the absence of catalysts.

J. The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously but continuity is preferred.

K. The following examples have been carried out and have been selected for inclusion in this specification because they show a number of the compounds which have been successfully pyrolyzed, and a number of classes thereof, and a variety of reaction conditions. The applicants present these examples not as constituting any limitation of the work which has actually been done, but as sufficiently representative to enable persons skilled in the art to practice the invention. In these examples the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. Unless otherwise noted, the examples were carried out at a pressure of about one atmosphere. The temperatures of the reactions were measured with a thermocouple which was placed in contact with the outer surface of the reaction tube near the center of the heated zone, so that the true average temperatures of the gases in the tube may have been somewhat lower than the values given.

*Example I*

$CF_2Br$—$CClFBr$ was passed through a platinum tube 2.9 mm. in diameter by 450 mm. long at the rate of about 44 g./hr. while the temperature of the apparatus was maintained at 780°–850° C. The reaction products were condensed in receivers cooled to 25° and —70° C., washed with alkaline sodium sulfite solutions and dried. The organic products thus obtained had a distillation range of from +5° to 155° C. The starting material had a distillation range of 92.2–94.1° C.

*Example II*

$CHF_2Br$ was passed through a platinum-lined Inconel-jacketed nickel tube, 13.7 mm. i. d.×108 cm., at a rate of about 42.6 g. per hour while the pressure in the tube was kept at approximately one atmosphere. The tube temperature was maintained at about 615° C. over an estimated length of 200 mm. by electrical heating. Free bromine was detected in the wash water. The reaction products were washed with water, dried and condensed in receivers cooled to about —70° C. A receiver cooled in liquid nitrogen was placed after the receiver cooled to —70° C. Acid analysis showed a conversion of about 46%. A total of about 179 g. of crude organic products were collected. The following compounds have been found in the reaction mass: $C_3F_6H_2$ having a boiling point of about 10–11° C. and a vapor density of 6.97 g./liter at 21° C. and 760 mm.; $CHF_3$ having a boiling point of —81° C.; $HC_3F_6Br$ boiling at 40° 41° C. and having a vapor density of 5.76 g. per liter at 28° C. and 452 mm.

L. The reaction products may be washed with water or alkaline solutions to remove acid constituents before condensation and analysis, although this is not necessary. In some cases, it is advantageous to separate certain desired components before acid removal.

M. The process produces both saturated and unsaturated products. Among the saturated compounds which are produced are mono carbon fluorides, such as $CClF_3$, and fluorides having a plurality of carbon atoms. The process may also be made to produce compounds in arithmetical series, of which an example is the compounds of the formula $C_nF_{2n}HX$, in which X is Br or Cl and n is 3 or more. Some of the product compounds contain fewer atoms than the starting material and others contain more. By proper selection of the starting material and of the conditions of reaction almost infinitely various results may be obtained. It has been observed that the products tend to increase in stability as they approach saturation by fluorine; for example, the compound $CHF_3$ is very stable; in several cases the substitution of fluorine for other halogens has produced a decrease in the reactivity of the compound. Because of this, the process is a particularly satisfactory method of producing reactions of the type described among fluoro compounds containing other halogens.

N. The particular advantage of the invention is that a pyrolytic process has been discovered for the production of new compounds and for the more efficient production of old compounds, which is characterized by its simplicity and ease with which it may be operated. The invention provides an efficient method of producing organic compounds containing fluorine. These compounds have uses in themselves, such as for refrigerants, anaesthetics, and solvents and are useful as intermediates for the production of alcohols, esters, halides, and alkyl derivatives. The invention is also useful for the synthesis of compounds having more carbon atoms than the compound pyrolyzed, and for the extension of carbon chains. The process involves the pyrolysis of compounds of both light and heavy molecular weight. The pyrolysis has been carried out in both a continuous and a step-wise manner, and a large variety of conditions has been employed.

O. As many apparently widely different embodiments of this invention may be made without departing from the spirit and scope thereof, it is to be understood that we do not limit ourselves to the specific embodiments thereof except as defined by the appended claims.

We claim:

1. The compound represented by the formula:

$$H(CF_2)_3Br$$

2. The process of converting fluoro-bromo alkanes to different fluorine and bromine containing organic compounds which comprises passing the fluoro-bromo alkane through an inert reaction tube heated to from about 600° C. to about 850° C. and separating the conversion products.

3. The process for producing $C_3F_6H_2$ and $HC_3F_6Br$ which comprises passing $CHF_2Br$ through an inert reaction tube heated to from about 600° C. to about 1000° C. and separating the $C_3F_6H_2$ and $HC_3F_6Br$ from the reaction mass.

FREDERICK B. DOWNING.
ANTHONY F. BENNING.
ROBERT C. McHARNESS.